United States Patent
Wood

(10) Patent No.: US 10,401,501 B2
(45) Date of Patent: Sep. 3, 2019

(54) AUTONOMOUS VEHICLE SENSOR CALIBRATION SYSTEM

(71) Applicant: Uber Technologies, Inc., San Francisco, CA (US)

(72) Inventor: Matthew Shaw Wood, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/475,934

(22) Filed: Mar. 31, 2017

(65) Prior Publication Data

US 2018/0284243 A1   Oct. 4, 2018

(51) Int. Cl.
*G01S 17/93* (2006.01)
*G01S 7/497* (2006.01)
*G05D 1/00* (2006.01)

(52) U.S. Cl.
CPC .......... *G01S 17/936* (2013.01); *G01S 7/4972* (2013.01); *G05D 1/0088* (2013.01)

(58) Field of Classification Search
CPC .................................. G01C 25/00; B60R 1/00
See application file for complete search history.

(56) References Cited

U.S. PATENT DOCUMENTS

| | | | |
|---|---|---|---|
| 8,868,258 B2 * | 10/2014 | Papadopoulos | B64G 1/002 701/3 |
| 8,970,834 B2 * | 3/2015 | Soininen | G01S 17/936 356/138 |
| 9,327,743 B2 * | 5/2016 | Green | B61L 15/0063 |
| 9,389,298 B2 * | 7/2016 | Smitherman | G01C 11/02 |
| 9,429,403 B2 * | 8/2016 | Papadopoulos | B64G 1/002 |
| 9,829,883 B1 * | 11/2017 | Lavoie | G05D 1/0016 |
| 9,963,106 B1 * | 5/2018 | Ricci | B60R 25/2018 |
| 2014/0297128 A1 * | 10/2014 | Lavoie | G01B 21/06 701/41 |

(Continued)

OTHER PUBLICATIONS

Pereira, Marcelo, Self Calibration of multiple LIDARs and cameras on autonomous vehicles, Robotics and Autonomous Systems, 83, https://www.sciencedirect.com/journal/robotics-and-autonomous-systems, May 2016, 32 pages.

*Primary Examiner* — Alex C Dunn
(74) *Attorney, Agent, or Firm* — Dority & Manning, P.A.

(57) ABSTRACT

Systems and methods for automatically calibrating autonomous vehicle sensors are provided. In one example embodiment, a computer implemented method includes obtaining data associated with one or more targets located onboard an autonomous vehicle. The data associated with the targets is acquired via one or more first sensors located onboard a first portion of the autonomous vehicle. The targets are located onboard a second portion of the autonomous vehicle. The method includes determining a movement associated with the second portion of the autonomous vehicle based at least in part on the data associated with the targets. The method includes determining a sensor correction action associated with one or more second sensors located onboard the second portion of the autonomous vehicle based at least in part on the movement. The method includes implementing the sensor correction action for the second sensors located onboard the second portion of the autonomous vehicle.

19 Claims, 8 Drawing Sheets

(56) References Cited

U.S. PATENT DOCUMENTS

| | | | |
|---|---|---|---|
| 2014/0330457 A1* | 11/2014 | Papadopoulos | B64G 1/002 |
| | | | 701/3 |
| 2017/0106796 A1* | 4/2017 | Lavoie | B60R 1/00 |
| 2017/0223346 A1* | 8/2017 | Derenick | B64C 39/024 |
| 2017/0313332 A1* | 11/2017 | Paget | B61L 27/0077 |
| 2018/0045536 A1* | 2/2018 | Kummerle | G01C 3/00 |

\* cited by examiner

AUTONOMOUS VEHICLE SENSOR CALIBRATION SYSTEM

FIELD

The present disclosure relates generally to improved calibration of the sensors of an autonomous vehicle, and more particularly to improved local, onboard calibration of the sensors of the autonomous vehicle.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of automatically calibrating autonomous vehicle sensors. The method includes obtaining, by one or more computing devices, data associated with one or more targets located onboard an autonomous vehicle. The data associated with the one or more targets is acquired via one or more first sensors located onboard a first portion of the autonomous vehicle. The one or more targets are located onboard a second portion of the autonomous vehicle. The method includes determining, by the one or more computing devices, a movement associated with the second portion of the autonomous vehicle based at least in part on the data associated with the one or more targets. The method includes determining, by the one or more computing devices, a sensor correction action associated with one or more second sensors located onboard the second portion of the autonomous vehicle based at least in part on the movement associated with the second portion of the autonomous vehicle. The method includes implementing, by the one or more computing devices, the sensor correction action for the one or more second sensors located onboard the second portion of the autonomous vehicle.

Another example aspect of the present disclosure is directed to a computing system for automatically calibrating autonomous vehicle sensors. The computing system includes one or more processors, one or more tangible, non-transitory, computer readable media that collectively store instructions that when executed by the one or more processors cause the computing system to perform operations. The operations include obtaining data associated with one or more targets located onboard an autonomous vehicle. The data associated with the one or more targets is acquired via one or more first sensors located onboard a first portion of the autonomous vehicle. The operations include determining a movement associated with a second portion of the autonomous vehicle based at least in part on the data associated with the one or more targets. The operations include determining a sensor correction action of one or more second sensors located onboard the second portion of the autonomous vehicle based at least in part on the movement associated with the second portion of the autonomous vehicle. The operations include implementing the sensor correction action for the one or more second sensors located onboard the second portion of the autonomous vehicle.

Yet another example aspect of the present disclosure is directed to an autonomous vehicle. The autonomous vehicle includes a first portion with one or more first sensors, a second portion with one or more second sensors, one or more processors, and one or more tangible, non-transitory, computer readable media that collectively store instructions that when executed by the one or more processors cause the one or more processors to perform operations. The operations include obtaining data associated with a plurality of targets located onboard the autonomous vehicle. The operations include determining a movement associated with at least one of the first portion or the second portion of the autonomous vehicle based at least in part on the data associated with the plurality of targets. The operations include determining a sensor correction action associated with at least one of the first sensors or the second sensors based at least in part on the movement. The operations include implementing the sensor correction action for at least one of the first sensors or the second sensors.

Other example aspects of the present disclosure are directed to systems, methods, vehicles, apparatuses, tangible, non-transitory computer-readable media, and memory devices for automatically calibrating autonomous vehicle sensors.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
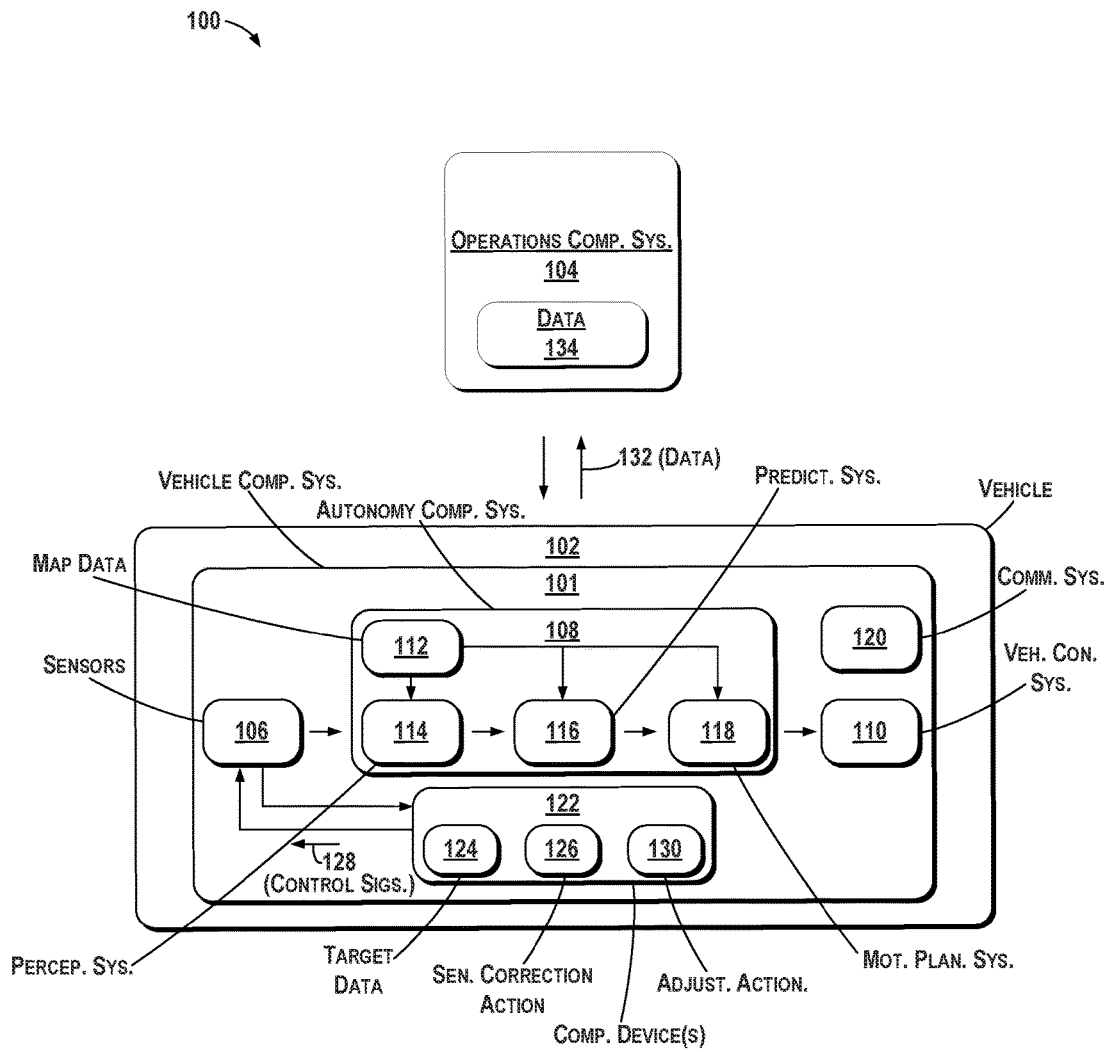
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to improved calibration of the sensors of an autonomous vehicle while the autonomous vehicle is travelling. An autonomous vehicle can drive, navigate, operate, etc. with minimal and/or no interaction from a human driver to provide a vehicle service. By way of example, an autonomous vehicle can be an autonomous truck that is configured to autonomously navigate to deliver a shipment to a destination location. In order to autonomously navigate, the autonomous truck can include a plurality of sensors (e.g., a LIDAR system, etc.) configured to obtain sensor data associated with the vehicle's surrounding environment. For instance, one or more first sensors can be located onboard a frame portion of the autonomous truck and one or more second sensors can be located onboard a cab portion of the autonomous truck. The cab portion and the frame portion can move at least partially independent of one another (e.g., via a suspension system associated with the cab, etc.). Such movement can cause the vehicle's sensor(s) to shift position, angle, field of view, etc. and increase the potential error of the sensor data.

In accordance with the present disclosure, the onboard computing system of the autonomous truck can be configured to utilize the vehicle's sensors to detect the movement of the cab portion and/or frame portion and re-calibrate the sensors in accordance with such movement. By way of example, the vehicle computing system can detect a movement (e.g., roll, pitch, yaw, change in elevation, etc.) of the cab portion via the first sensors located onboard the frame portion. The vehicle computing system can determine a sensor correction action (e.g., a physical adjustment, region of interest adjustment, a corrective data transformation, etc.) associated with the second sensors (onboard the cab portion) based at least in part on the detected movement. To re-calibrate the second sensors, the vehicle computing system can send control signal(s) to adjust the second sensors (e.g., physically, via field of view adjustment, via data transformation, etc.) based at least in part on the sensor correction action. In this way, the vehicle computing system of the autonomous vehicle can locally re-calibrate the vehicle's sensors that are affected by certain vehicle movements.

More particularly, an autonomous vehicle can be a ground-based vehicle with multiple portions that can move at least partially independent of one another. For example, the autonomous vehicle can be an autonomous truck that includes a first portion and a second portion that move at least partially independently from one another. For example, the first portion can be a frame portion and the second portion can be a cab portion that are affixed to one another (e.g., permanently, temporarily). The cab portion can move at least partially independently from the frame portion due to a suspension system associated with the cab portion (e.g., air suspension, spring suspension, etc.). In some implementations, the first portion can be a trailer portion and the second portion can be the cab portion. The trailer portion and the cab portion can be affixed to one another via a connection (e.g., hinge, pivot, etc.). The pivot connection can allow the cab portion to pull the trailer portion, while also allowing the respective portions to move at least partially independently from one another (e.g., one portion experiences a pitch, yaw, roll, etc. movement while the other does not).

The autonomous vehicle can include a vehicle computing system with various components to help the vehicle autonomously navigate with minimal and/or no interaction from a human driver. For example, the autonomous vehicle can include a plurality of sensors (e.g., light detection and ranging (LIDAR) sensors, radio detection and ranging sensors, cameras, etc.). The sensors can be configured to acquire sensor data associated with the surrounding environment of the vehicle. The sensor data can be used in a processing pipeline that includes the detection of objects approximate to the autonomous vehicle, object motion prediction, and vehicle motion planning. The sensors can be placed on the various portions of the vehicle. For example, one or more first sensors can be located onboard a first portion (e.g., the frame portion, trailer portion) of the autonomous vehicle and one or more second sensors can be located onboard a second portion (e.g., the cab portion) of the autonomous vehicle. As such, the sensors can be subjected to the independent movements of that respective vehicle portion. The vehicle computing system can be configured to detect such movement and adjust the sensors to compensate accordingly.

The autonomous vehicle can also include one or more targets to help detect the movement of a portion of the autonomous vehicle. The target(s) can be a designated component of the vehicle (e.g., a corner of the cab, etc.) and/or a target coupled to the vehicle that can be recognized by the vehicle sensors (e.g., a photomarker, other reference mechanism, etc.). By way of example, the cab portion of the autonomous vehicle (e.g., truck) can include one or more targets (e.g., the corners of the cab, photomarkers placed on the back of the cab). Additionally, or alternatively, the trailer portion of the autonomous vehicle can include one or more targets.

The vehicle computing system can obtain data associated with the one or more targets. For example, the targets located onboard the second portion of the vehicle (e.g., cab portion) can be within a field of view of the first sensor(s) (e.g., LIDAR system, etc.) located on the first portion of the vehicle (e.g., frame portion, trailer portion). The vehicle computing system can obtain data associated with the plurality one or more targets via the first sensor(s). The data associated with the plurality of targets can be indicative of one or more characteristics associated with at least one of the targets (e.g., a position, an orientation, reflectivity, other characteristics, a change in a characteristic, etc.).

The vehicle computing system can determine a movement associated with a portion of the autonomous vehicle based at least in part on the data associated with the one or more targets. The vehicle computing system can compare characteristics associated with one target (e.g., the position, orientation, configuration, etc.) to the characteristics associated with another target to detect such movement. For instance, the vehicle computing system can compare the position of a first target (e.g., located in the bottom-left corner of the cab back) to the position of a second target (e.g., located in the bottom-right corner of the cab back) to determine whether the cab portion is experiencing a roll movement. In the event that the first target (e.g., bottom left) is lower than the second target (e.g., bottom right) the vehicle computing system can determine that the cab portion is experiencing a left roll movement. In the event that the first target (e.g., bottom left) is higher than the second target (e.g., bottom right) the vehicle computing system can determine that the cab portion is experiencing a right roll movement.

Additionally, or alternatively, the vehicle computing system can compare a position of a first target (e.g., located in the top-left corner of the cab back) and/or a position of a second target (e.g., located in the top-right corner of the cab back) to a reference to determine whether the vehicle is experiencing a pitch movement. The reference can include, for example, the fixed location of a first sensor onboard the first portion. In the event that the distance between the first and/or second target (e.g., located at the top of the cab back) is increasing with respect to the fixed location of the first sensor, the vehicle computing system can determine that the first portion (e.g., cab portion) is experiencing a forward pitch movement (e.g., moving away from the frame, trailer). In the event that the distance between the first and/or second target is decreasing with respect to the fixed location of the first sensor, the vehicle computing system can determine that the first portion (e.g., cab portion) is experiencing a backward pitch movement (e.g., moving towards the frame, trailer).

In some implementations, the vehicle computing system can compare targets across portions and/or detect other types of movement. For example, the vehicle computing system can compare the characteristics (e.g., position, orientation, etc.) of a first target (e.g., located on the cab portion) to the characteristics of a second target (e.g., located on the frame, trailer portion) to determine the movement associated with the second portion (e.g., cab portion) and/or the movement of the first portion (e.g., frame portion, trailer portion), as further described herein. The vehicle computing system can also, or alternatively, determine that a portion of the autonomous vehicle is experiencing other types of movement such as a yaw movement, change in elevation, etc.

To help compensate for the vehicle's movement, the vehicle computing system can determine a sensor correction action associated with the onboard sensors. For example, the vehicle computing system can determine that the field of view of the second sensor(s) (e.g., the cab mounted LIDAR system) has shifted due to the movement of the cab portion (e.g., a backwards pitch movement). The vehicle computing system can determine that the second sensor(s) should be physically adjusted to compensate for the pitch in order to correct the sensors' field of view. As such, the vehicle computing system can send one or more control signals to physically adjust the sensor(s) to implement the sensor correction action.

A sensor correction action can also, or alternatively, include an action that does not incorporate physical manipulation of a sensor. For example, a region of interest associated with the second sensor(s) (e.g., within the field of view) may have changed due to the movement of the vehicle. By way of example, after movement of the cab portion, a region of interest may include more area above the vehicle than intended or needed for autonomous navigation. The vehicle computing system can determine that the region of interest should be adjusted to compensate for the cab movement. Accordingly, the vehicle computing system can send one or more control signals to adjust the region of interest associated with the second sensor(s) such that the second sensor(s) focus on the correct region of interest within the field of view.

In some implementations, the vehicle computing system can determine that the second sensor(s) (e.g., the cab mounted LIDAR system) may acquire sensor data at an abnormal angle due to the movement of the vehicle (e.g., a roll movement of the cab portion). The vehicle computing system can determine that a transformation parameter (e.g., data transformation function, algorithm, variable, etc.) should be applied to the sensor data (e.g., image data, etc.) captured by the second sensor(s) to correct for abnormalities caused by the movement of the cab portion (e.g., a roll movement, etc.). Accordingly, the vehicle computing system can send control signal(s) to adjust the sensor data in accordance with the transformation parameter to properly compensate for the vehicle movement that affects the sensor data. In some implementations, the vehicle computing system can adjust other vehicle components (e.g., a potentiometer associated with the vehicle's shocks, etc.) based at least in part on the detected movement of the autonomous vehicle (e.g., the cab portion, frame portion, trailer portion).

In some implementations, the vehicle computing system can provide data to one or more computing devices that are remote from the autonomous vehicle. The remote computing device(s) can be associated with an owner, manager, central operations center, etc. of the autonomous vehicle. The vehicle computing system can, for example, provide at least one of the data associated with the one or more targets, data associated with the movement of a portion of the autonomous vehicle (e.g., the cab portion, frame portion, trailer portion), or data associated with the sensor correction action. The remote computing device(s) can process the data to determine parameters (e.g., grade, quality, incline, etc.) associated with a particular travel way (e.g., road, etc.) on which the autonomous vehicle was travelling. Such information can be utilized for future vehicle routing (e.g., to avoid certain travel ways), to update map data (e.g., to indicate hazardous conditions), etc. In some implementations, the remote computing device(s) can use the information to pre-configure the vehicle's sensors for a particular travel way segment. By way of example, the remote computing device(s) can provide data indicative of a sensor correction action to an autonomous vehicle (before and/or while the vehicle travels across a travel way) so that the vehicle can be pre-configured to implement a sensor correction action as the vehicle travels across the travel way.

The systems and methods described herein may provide a number of technical effects and benefits. For instance, the vehicle computing system can locally (e.g., on-board the vehicle) detect vehicle movements that may affect the vehicle sensors. The autonomous vehicle can react accordingly (without communication to a remote computing system) to prevent the vehicle movements from compromising the sensor data. By locally addressing this issue, the autonomous vehicle can avoid potential latency issues that can arise when communicating with remote computing devices (e.g., due to poor network connectivity, data upload/download, queue delays, etc.).

Additionally, the systems and methods provide for more accurate autonomous operation. For instance, as described herein, sensor data can be used to detect objects within the vehicle's surroundings and to help predict the motion of such objects, which is ultimately used for vehicle motion planning. Thus, erroneous sensor data can lead to less accurate object detection, object motion prediction, and vehicle motion planning. The movements associated with a particular portion of a vehicle can corrupt the sensor data captured by the sensors mounted on that vehicle portion (e.g., cab portion, etc.). The systems and methods described herein provide a solution to address potential sensor errors in real-time, as the errors may arise due to vehicle movements. Thus, the systems and methods of the present disclosure can improve autonomous vehicle operation by correcting and/or preventing a large amount of erroneous sensor data. This can also save vehicle memory storage that would otherwise be allocated to such erroneous data.

The system and methods of the present disclosure provide the ability to pre-configure the autonomous vehicles to account for potential vehicle movements. For example, as described herein, the vehicle computing system can send data to a remote computing device to update map data as well as to determine a vehicle pre-configuration plan to account for the detected vehicle movements associated with a particular travel way. The updated map data and pre-configuration plans can be implemented within other autonomous vehicles such that the other vehicles can pre-emptively adjust vehicle sensors to compensate for any vehicle movements that may affect such sensors. Accordingly, the present disclosure provides an effective approach to pre-emptively adjust vehicle sensors to compensate for potential sources of error (e.g., caused by certain vehicle movements, etc.).

The systems and methods of the present disclosure also provide an improvement to vehicle computing technology, such as autonomous vehicle computing technology. For instance, the systems and methods enable the vehicle technology to locally detect and correct for potential sensor errors caused by vehicle movement. For example, the systems and methods enable one or more on-board computing device(s) to obtain data associated with one or more targets located onboard an autonomous vehicle. The data associated with the one or more targets can be acquired via one or more first sensors located onboard a first portion of the autonomous vehicle. The one or more targets can be located onboard a second portion of the autonomous vehicle. The computing device(s) can determine a movement associated with the second portion of the autonomous vehicle based at least in part on the data associated with the one or more targets. The computing device(s) can determine a sensor correction action associated with one or more second sensors located onboard the second portion of the autonomous vehicle based at least in part on the movement associated with the second portion of the autonomous vehicle. The computing device(s) can provide one or more control signals to adjust the one or more second sensors based at least in part on the adjustment action. In this way, the systems and methods enable the autonomous vehicle to leverage its existing autonomous hardware (e.g., sensors) located onboard one portion of the vehicle to help correct the sensors associated with another portion of the vehicle. Thus, the systems and methods of the present disclosure can improve the accuracy of vehicle sensor technology, as well as the efficacy of the vehicle's autonomy system.

With reference now to the FIGS., example embodiments of the present disclosure will be discussed in further detail. FIG. 1 depicts an example system 100 according to example embodiments of the present disclosure. The system 100 can include a vehicle computing system 101 associated with a vehicle 102 and an operations computing system 104 that is remote from the vehicle 102.

The vehicle 102 incorporating the vehicle computing system 101 can be a ground-based autonomous vehicle (e.g., car, truck, bus), an air-based autonomous vehicle (e.g., airplane, drone, helicopter, or other aircraft), or other types of vehicles (e.g., watercraft). The vehicle 102 can be an autonomous vehicle that can drive, navigate, operate, etc. with minimal and/or no interaction from a human driver. For example, the vehicle 102 can operate semi-autonomously with some interaction from a human driver present in the vehicle. The vehicle 102 can be configured to operate in a fully autonomous manner (e.g., self-driving manner) such that the vehicle 102 can drive, navigate, operate, etc. with no interaction from a human driver.

Figure 2:
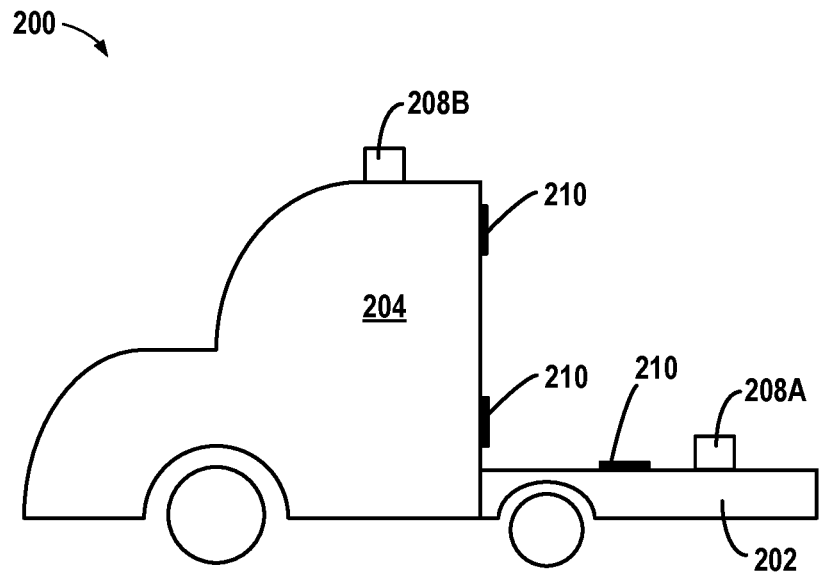
FIG. 2 depicts a diagram of an example autonomous vehicle according to example embodiments of the present disclosure.
Figure 2:
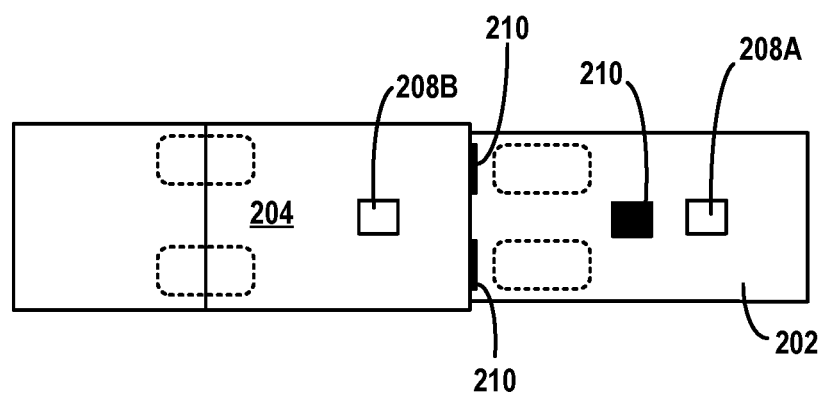

FIG. 2 depicts an example vehicle 200 according to example embodiments of the present disclosure. The vehicle 102 can be the vehicle 200 or can be other types of vehicles. The vehicle 200 is an autonomous truck that includes a first portion and a second portion (e.g., different than the first portion). The first portion and the second portion can be configured to move at least partially independently from one another. For example, one portion can experience a movement (e.g., a pitch, yaw, roll, other movement) while the other portion does not. As examples, the first and the second portions can be non-rigidly coupled; flexibly coupled; jointedly coupled; pivotably coupled; coupled via a ball and socket connection; and/or coupled via other forms of coupling that allow at least partial independent movement respective to each other. By way of example, the first portion can be a frame portion 202 and the second portion can be a cab portion 204, or vice versa, that are affixed to one another. The cab portion 204 can move at least partially independently from the frame portion 202 due to a suspension system associated with the cab portion 204 (e.g., air suspension, spring suspension, etc.).

Figure 3:
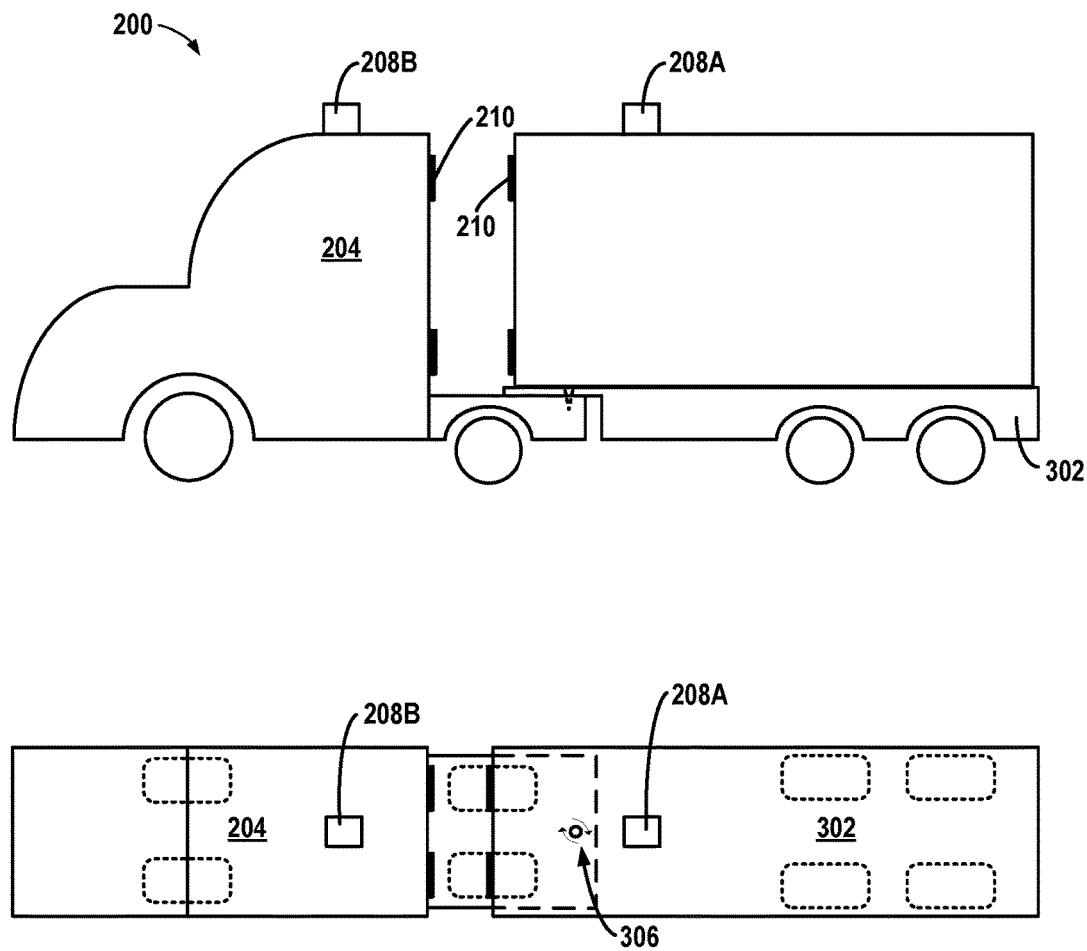
FIG. 3 depicts a diagram of an example autonomous vehicle according to example embodiments of the present disclosure.

As shown in FIG. 3, in some implementations, the first portion can be a trailer portion 302 and the second portion can be the cab portion 204, or vice versa. The trailer portion 302 and the cab portion 204 can be affixed to one another via a connection 306 (e.g., a pivot, hitch, other connection). The connection 306 can allow the cab portion 204 to pull the trailer portion 302, while also allowing the respective portions to move at least partially independently from one another (e.g., one portion experiences a pitch, yaw, roll, etc. movement while the other does not).

The configurations shown in FIGS. 2 and 3 are not meant to be limiting. For example, the first and second portions of the vehicle can be other portions of the vehicle than those shown and discussed.

Returning to FIG. 1, the vehicle 102 can include one or more sensors 106, an autonomy computing system 108, and one or more vehicle control systems 110. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The sensor(s) 106 can be configured to obtain acquire sensor data associated with one or more objects that are proximate to the vehicle 102 (e.g., within a field of view of one or more of the sensor(s) 106). The sensor(s) 106 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or other types of sensors. The sensor data can include image data, radar data, LIDAR data, and/or other data acquired by the sensor(s) 106. The object(s) can include, for example, pedestrians, vehicles, bicycles, and/or other objects. The object(s) can be located in front of, to the rear of, and/or to the side of the vehicle 102. The sensor data can be indicative of locations associated with the object(s) within the surrounding environment of the vehicle 102 at one or more times. The sensor(s) 106 can provide the sensor data to the autonomy computing system 108.

The sensor(s) 106 can be placed on the various portions of the vehicle 102. For instance, as shown in FIG. 2, one or more first sensors 208A (e.g., a LIDAR system) can be located onboard a first portion of the vehicle 102 and one or more second sensors 208B (e.g., a LIDAR system) can be located onboard the second portion of the vehicle 102. By way of example, the vehicle 102 can include a first portion (e.g., the frame portion 202) with one or more first sensors 208A and the vehicle 102 can include a second portion (e.g., the cab portion 204) with one or more second sensors 208B. As such, the first and second sensors 208A-B can be subjected to the independent movements of the respective vehicle portion on which the respective sensor(s) are located (e.g., on the frame portion 202, the cab portion 204). The vehicle computing system 101 can be configured to detect such movement and adjust the sensors to compensate accordingly, as further described herein.

In another example, as shown in FIG. 3, the one or more first sensors 208A can be located onboard a trailer portion 302 and the one or more second sensors 208B can be located on the cab portion 204. Accordingly, the first and second sensors 208A-B can be subjected to the independent movements of the respective vehicle portion on which the respective sensor(s) are located (e.g., on the trailer portion 302, the cab portion 204). While FIG. 3 depicts the first sensor(s) 208A as being located on a container included with the trailer portion 302 this is not intended to be limiting. The first sensor(s) 208A can be located on any portion of the trailer portion 302. For example, the first sensor(s) 208A can be located directly on the body of a trailer itself regardless of whether a container is present.

Returning to FIG. 1, in addition to the sensor data, the autonomy computing system 108 can retrieve or otherwise obtain map data 112 associated with the surroundings of the vehicle 102. The map data 112 can provide detailed information about the surrounding environment of the vehicle 102. For example, the map data 112 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 102 in comprehending and perceiving its surrounding environment and its relationship thereto.

The autonomy computing system 108 can include a perception system 114, a prediction system 116, and a motion planning system 118 that cooperate to perceive the surrounding environment of the vehicle 102 and determine a motion plan for controlling the motion of the vehicle 102 accordingly. For example, the autonomy computing system 108 can receive the sensor data from the sensor(s) 106, attempt to comprehend the surrounding environment by performing various processing techniques on data collected by the sensor(s) 106, and generate an appropriate motion plan through such surrounding environment. The autonomy computing system 108 can control the one or more vehicle control systems 110 to operate the vehicle 102 according to the motion plan.

The autonomy computing system 108 can identify one or more objects that are proximate to the vehicle 102 based at least in part on the sensor data and/or the map data 112. For example, the perception system 114 can obtain state data descriptive of a current state of an object that is proximate to the vehicle 102. The state data for each object can describe, for example, an estimate of the object's: current location (also referred to as position); current speed (also referred to as velocity); current acceleration; current heading; current orientation; size/footprint (e.g., as represented by a bounding polygon); class (e.g., pedestrian class vs. vehicle class vs. bicycle class), and/or other state information. The perception system 114 can provide the state data to the prediction system 116 (e.g., for predicting the movement of an object).

The prediction system 116 can create predicted data associated with each of the respective one or more objects proximate to the vehicle 102. The predicted data can be indicative of one or more predicted future locations of each respective object. The predicted data can be indicative of a predicted path (e.g., predicted trajectory) of at least one object within the surrounding environment of the autonomous vehicle 102. For example, the predicted path (e.g., trajectory) can indicate a path along which the respective object is predicted to travel over time (and/or the speed at which the object is predicted to travel along the predicted path). The prediction system 116 can provide the predicted data associated with the object(s) to the motion planning system 118.

The motion planning system 118 can determine a motion plan for the vehicle 102 based at least in part on the predicted data. The motion plan can include vehicle actions with respect to the objects proximate to the vehicle 102 as well as the predicted movements. For instance, the motion planning system 118 can implement an optimization algorithm that considers cost data associated with a vehicle action as well as other cost functions (e.g., based on speed limits, traffic lights, etc.), if any, to determine optimized variables that make up the motion plan. By way of example, the motion planning system 118 can determine that the vehicle 102 can perform a certain action (e.g., pass an object) without increasing the potential risk to the vehicle 102 and/or violating any traffic laws (e.g., speed limits, lane boundaries, signage). The motion plan can include a planned trajectory, speed, acceleration, etc. of the vehicle 102.

The motion planning system 118 can provide the motion plan indicative of the vehicle actions, a planned trajectory, and/or other operating parameters to the vehicle control system(s) 110 to implement the motion plan for the vehicle 102. For instance, the vehicle 102 can include a mobility controller configured to translate the motion plan into instructions. By way of example, the mobility controller can translate a determined motion plan into instructions to adjust the steering of the vehicle 102 "X" degrees, apply a certain magnitude of braking force, etc. The mobility controller can send one or more control signals to the vehicle control components (e.g., braking control component, steering control component) to execute the instructions and implement the motion plan.

The vehicle 102 can include a communications system 120 configured to allow the vehicle computing system 101

(and its computing device(s)) to communicate with other computing devices. The vehicle computing system 101 can use the communications system 120 to communicate with the operations computing system 104 and/or one or more other remote computing device(s) over one or more networks (e.g., via one or more wireless signal connections). In some implementations, the communications system 120 can allow communication among one or more of the system(s) on-board the vehicle 102. The communications system 120 can include any suitable components for interfacing with one or more network(s), including for example, transmitters, receivers, ports, controllers, antennas, or other suitable components that can help facilitate communication with one or more remote computing device(s) that are remote from the vehicle 102.

In some implementations, the vehicle 102 can provide one or more vehicle services. The vehicle service(s) can include shipping services, delivery services, courier services, transportation services (e.g., rideshare services), and/or other types of services. For instance, the vehicle 102 can operate in an autonomous navigation mode to deliver a shipment of goods to a destination location. In some implementations, the vehicle 102 can be associated with an entity (e.g., a service provider, owner, manager). In some implementations, the entity (e.g., a service provider) can be one that provides one or more vehicle service(s) to a plurality of users via a fleet of vehicles that includes, for example, the vehicle 102. In some implementations, the entity can be associated with only vehicle 102 (e.g., a sole owner, manager). The operations computing system 104 (e.g., including one or more remote computing devices) can be associated with the entity. For example, the operations computing system 104 can be configured to help manage and/or coordinate the vehicle 102 (and its associated fleet) to provide vehicle services.

The vehicle 102 can include one or more computing devices 122 (e.g., associated with a sensor compensation system) to help compensate for vehicle movement experienced by one or more sensor(s). The computing device(s) 122 can be included with and/or separate from the autonomy computing system 108 and/or its sub-systems (e.g., perception system 114, prediction system 116, motion planning system 118). The computing device(s) 122 can be configured to communicate with one or more of the other components of the vehicle 102 (e.g., of the vehicle computing system 101). The computing device(s) 122 can include various components for performing various operations and functions. For instance, the computing device(s) 122 can include one or more processor(s) and one or more tangible, non-transitory, computer readable media, each of which are on-board the vehicle 102. The one or more tangible, non-transitory, computer readable media can store instructions that when executed by the one or more processor(s) cause the one or more processor(s) (the vehicle computing system 101) to perform operations and functions, such as those for calibrating (e.g., re-calibrating) autonomous vehicle sensors, as described herein.

To help detect the movement of a vehicle portion, one or a plurality of targets 210 can be located on the vehicle 102, as shown in FIGS. 2 and 3. The target(s) 210 can be a designated component of the vehicle 102 (e.g., part(s) of the frame portion 202, part(s) of the cab portion 204, part(s) of the trailer portion 302). Additionally, or alternatively, the one or more targets 210 can include a target coupled to the vehicle 102 that can be recognized by the vehicle sensors such as, for example, a photomarker (e.g., UV, infrared), a two dimensional matrix (e.g., QR code), three dimensional matrix, and/or other reference mechanisms. The one or more targets 210 can be located on the first portion of the vehicle 102 and/or on the second portion of the vehicle 102. By way of example, as shown in FIGS. 2 and 3, the cab portion 204 of the vehicle 102 can include one or more targets 210 such as the corners of the cab portion 204, photomarkers placed on the back of the cab portion 204, etc. Additionally, or alternatively, the frame portion 202 of the vehicle 102 can include one or more targets 210, as shown in FIG. 2. Additionally, or alternatively, the trailer portion 302 of the vehicle 102 can include one or more targets 210 such as, for example, directly on a body of the trailer, on a container, etc. (e.g., FIG. 3).

Returning to FIG. 1, the computing device(s) 122 can obtain data 124 associated with the one or more (e.g., a plurality) of targets 210 located onboard the vehicle 102. For example, the targets 210 located onboard the second portion of the vehicle 102 (e.g., cab portion 204) can be within a field of view of the first sensor(s) 208A located on the first portion of the vehicle 102 (e.g., the frame portion 202, the trailer portion 302). Additionally, or alternatively, the targets 210 located onboard the first portion of the vehicle 102 (e.g., the frame portion 202, the trailer portion 302) can be within a field of view of the second sensor(s) 208B located on the second portion of the vehicle 102 (e.g., the cab portion 204).

As the first and second sensor(s) 208A-B obtain sensor data associated with the surrounding environment of the vehicle 102, the first and second sensor(s) 208A-B can acquire the data 124 associated with the target(s) 210. For example, the data 124 associated with the one or more targets 210 located onboard the second portion of the vehicle 102 (e.g., the cab portion 204) can be acquired via the one or more first sensors 208A located onboard the first portion of the vehicle 102 (e.g., the frame portion 202, the trailer portion 302). The data 124 associated with the one or more targets 210 located onboard the first portion of the vehicle 102 (e.g., the frame portion 202, the trailer portion 302) can be acquired via the one or more second sensors 208B located onboard the second portion of the vehicle 102 (e.g., the cab portion 204). In this way, the computing device(s) 122 can obtain the data 124 associated with the one or more targets 210 by leveraging the sensor hardware already located onboard the vehicle 102.

The data 124 associated with the one or more targets 210 can be indicative of various characteristics associated with at least one of the targets. For example, the data 124 associated with the target(s) 210 can be indicative of a position, an orientation, a reflectivity, and/or other characteristics of a target at one or more times. For example, the data 124 can be indicative of a first position of a target (or each target) within a reference frame (e.g., x-y-z reference frame, polar coordinate reference frame, other reference frame) at a first time, a second position of the target (or each target) within the reference frame at a second time, a third position of the target (or each target) within the reference frame at a third time, etc. Additionally, or alternatively, the data 124 can be indicative of a first orientation (e.g., angular orientation, rotation, etc.) of a target (or each target) at a first time, a second orientation of the target (or each target) at a second time, a third orientation of the target (or each target) at a third time, etc. Additionally, or alternatively, the data 124 can be indicative of other characteristics (e.g., reflectivity, other) associated with a target (or each target) at one or more times, in a similar manner.

The computing device(s) 122 can determine a movement associated with a portion of the vehicle 102 based at least in part on the data 124 associated with the one or more targets.

For example, the computing device(s) 122 can determine a movement associated at least one of the first portion or the second portion of the vehicle 102 based at least in part on the data 124 associated with the one or more targets 210. The computing device(s) 122 can determine a movement associated with the first portion of the vehicle 102 based at least in part on the data 124 associated with the one or more targets (e.g., on the first portion). Additionally, or alternatively, the computing device(s) 122 can determine a movement associated with the second portion of the vehicle 102 based at least in part on the data 124 associated with the one or more targets (e.g., on the second portion).

To detect the movement associated with a portion of the vehicle 102, the computing device(s) 122 can analyze the data 124 associated with the one or more targets to determine a change in a characteristic (e.g., position, orientation, etc.) associated with one or more targets. The computing device(s) 122 can also determine the movement associated with a portion of the vehicle 102 based at least in part on a comparison of the characteristics of one or more target to another one or more targets.

Figure 4:
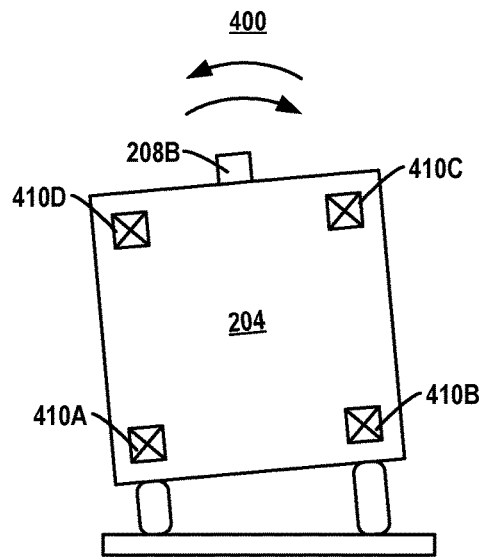
FIG. 4 depicts a diagram of example vehicle movement according to example embodiments of the present disclosure.

FIG. 4 depicts a diagram of example vehicle movement 400 according to example embodiments of the present disclosure. The vehicle movement 400 can be a movement associated with the second portion (e.g., cab portion 204). The movement associated with the second portion of the vehicle 102 can be associated with a roll movement of the second portion of the vehicle 102, as shown. The vehicle 102 can include one or more targets 410A-D located on the first portion of the vehicle 102 (e.g., located on the back of the cab portion 204). In some implementations, the computing device(s) 122 can determine the movement of the second portion of the vehicle 102 based at least in part on the data 124 associated with a single target. For example, the computing device(s) 122 can determine a change in the orientation (e.g., a counter-clockwise rotation) of the target 410A (e.g., a QR code) over time by comparing the orientation of the target 410A at a first time, to the orientation of the target 410A at a second time, etc. Accordingly, the computing device(s) 122 can determine that the second portion of the vehicle 102 (e.g., the cab portion 204), as well as the second sensors 208B onboard the second portion are experiencing a left roll movement.

Additionally, or alternatively, the computing device(s) 122 can compare the characteristics of one or more targets 410A-D to determine the movement 400. For instance, the targets 410A-D can include a first target 410A and a second target 410B. The computing device(s) 122 can determine the movement associated with the second portion of the vehicle 102 based at least in part on a comparison of a position of the first target 410A to a position of the second target 410B. For example, the computing device(s) 122 can compare the position of a first target 410A (e.g., located in the bottom-left corner of the cab back) to the position of a second target 410B (e.g., located in the bottom-right corner of the cab back) to determine whether the cab portion 204 is experiencing a roll movement. In the event that the first target 410A (e.g., bottom left) is lower than the second target 410B (e.g., bottom right) the computing device(s) 122 can determine that the cab portion 204 is experiencing a left roll movement. In the event that the first target 410A (e.g., bottom left) is higher than the second target 410B (e.g., bottom right) the computing device(s) 122 can determine that the cab portion 204 (and the second sensor(s) 208B located onboard) is experiencing a right roll movement.

Figure 5:
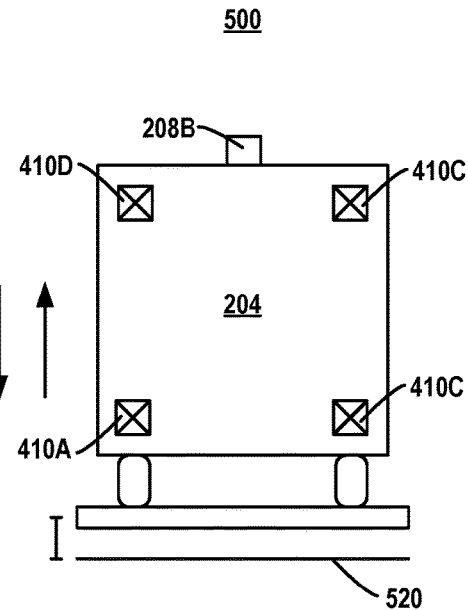
FIG. 5 depicts a diagram of example vehicle movement according to example embodiments of the present disclosure.

FIG. 5 depicts a diagram of another example vehicle movement 500 according to example embodiments of the present disclosure. The vehicle movement 500 can be a movement associated with the second portion (e.g., cab portion 204). The movement associated with the second portion of the vehicle 102 can be associated with a change in elevation of the second portion of the vehicle 102, as shown. The second portion (e.g., the cab portion 204) of the vehicle 102 can include one or more targets 410A-D. The computing device(s) 122 can determine the movement associated with the second portion of the vehicle 102 based at least in part on one or more of the targets 410A-D and/or a reference 520. The reference 520 can include a point, a line, a location, a distance, an elevation, etc. For instance, the computing device(s) 122 can compare the position of the targets 410A-B to the reference 520 (e.g., a reference elevation, line, other) to determine if a vertical distance between the targets and the reference 520 has increased or decreased. In the event that the vertical distance has increased and/or is increasing, the computing device(s) 122 can determine that the second portion of the vehicle 102 is experiencing an increase in elevation. In the event that that the vertical distance has decreased and/or is decreasing (and/or the position of the target has moved negatively past the reference 520), the computing device(s) 122 can determine that the second portion of the vehicle 102 (and the second sensor(s) 208B located onboard) is experiencing a decrease in elevation.

Figure 6:
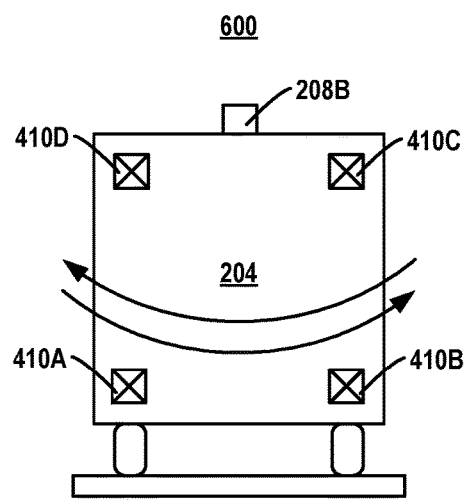
FIG. 6 depicts a diagram of example vehicle movement according to example embodiments of the present disclosure.

FIG. 6 depicts a diagram of example vehicle movement 600 according to example embodiments of the present disclosure. The vehicle movement 600 can be a movement associated with the second portion (e.g., cab portion 204) of the vehicle 102. The movement associated with the second portion of the vehicle 102 can be associated with a yaw movement of the second portion of the vehicle 102, as shown. The second portion (e.g., the cab portion 204) of the vehicle 102 can include one or more targets 410A-D. The computing device(s) 122 can determine the movement associated with the second portion of the vehicle 102 based at least in part on one or more of the targets 410A-D. For example, in some implementations, the computing device(s) 122 can compare a position of the a first target 410D (e.g., located in the top-left corner of the cab back) and/or a position of a second target 410A (e.g., located in the bottom-left corner of the cab back) to a reference to determine whether the vehicle 102 is experiencing a yaw movement. The reference can include, for example, a fixed location of the first sensor 208A onboard the first portion of the vehicle 102 (e.g., the frame portion 202, the trailer portion 302). In the event that the distance between the first and/or second target (e.g., located on the cab back) is increasing with respect to the fixed location of the first sensor 208A, the computing device(s) 122 can determine that the second portion of the vehicle 102 (e.g., cab portion 204 and the second sensors 208B onboard) is experiencing a left yaw movement (e.g., back of the cab portion 204 is rotating to the left). The computing device(s) 122 can further confirm that the second portion is experiencing the left yaw movement in the event that the distance between the reference and a third target 610C (e.g., upper-right) and/or the fourth target 610D (e.g., lower right) is decreasing. The computing device(s) 122 can perform a similar such analysis to determine whether a portion of the vehicle (and the sensor(s) located onboard) is experiencing a right yaw movement (e.g., the back of the cab portion is rotating to the right)

In some implementations, the computing device(s) 122 can determine that the vehicle 102 is experiencing a yaw movement by comparing the position of the target(s) 610A-

D. For example, in the event that the distance between the reference (e.g., the first sensor(s) 208A) and the targets 610A and/or 610D is increasing, while the distance between the reference (e.g., the first sensor(s) 208A) and the targets 610B and/or 610C is decreasing, the computing device(s) 122 can determine that the second portion of the vehicle 102 (e.g., the cab portion 204) is experiencing a left yaw movement. The computing device(s) 122 can perform a similar such comparative analysis to determine whether a portion of the vehicle is determining a right yaw movement (e.g., the back of the cab portion 204 is rotating to the right).

Figure 7A:
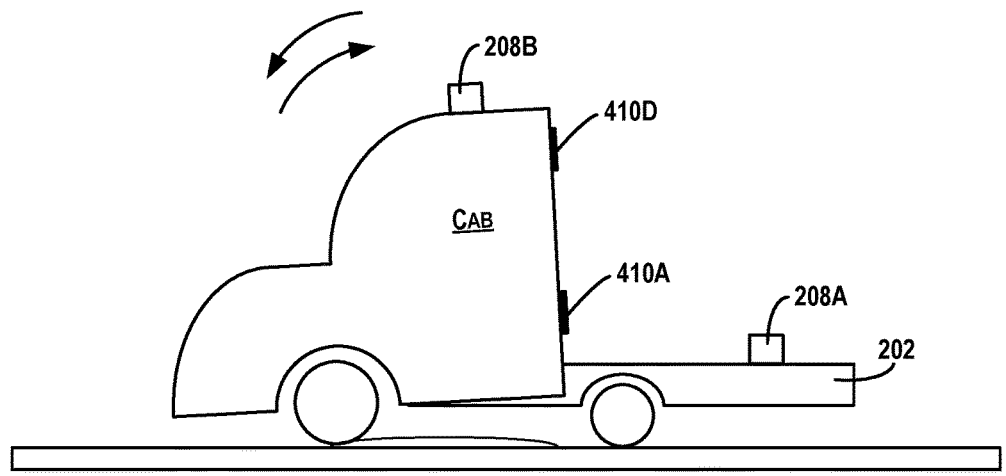
FIG. 7A-B depicts a diagram of example vehicle movement according to example embodiments of the present disclosure.
Figure 7B:
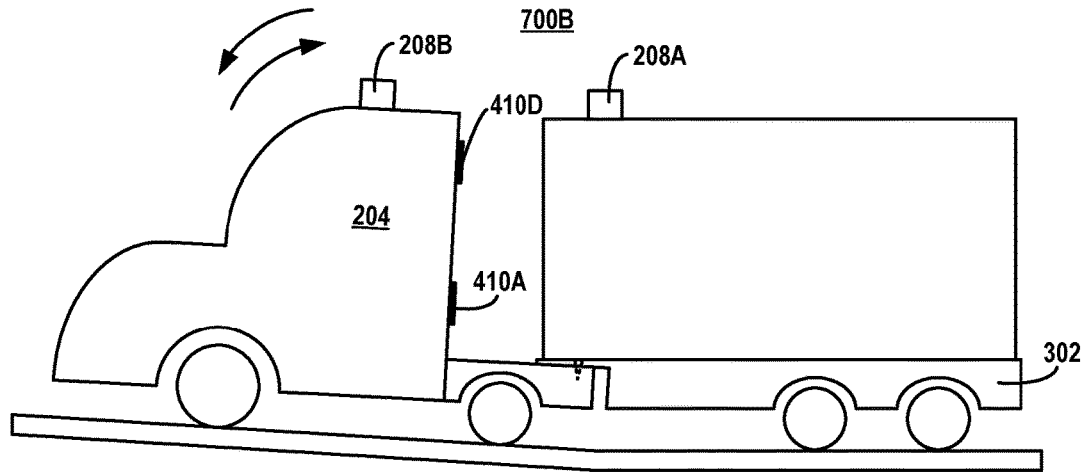

FIG. 7A-B depicts a diagram of example vehicle movements 700A-B according to example embodiments of the present disclosure. The vehicle movements 700A-B can be a movement associated with the second portion (e.g., cab portion 204) of the vehicle 102. The movement associated with the second portion of the vehicle 102 can be a change in pitch of the portion of the vehicle 102. In some implementations, the computing device(s) 122 can determine the existence of a pitch movement of the second portion of the vehicle 102 based at least in part on the data 124 associated with a single target. For example, the computing device(s) 122 can determine a change in the orientation of the target 410A (e.g., a three dimension matrix) over time by comparing the orientation of the target 410A at a first time, to the orientation of the target 410A at a second time, etc. Accordingly, the computing device(s) 122 can determine that the second portion of the vehicle 102 (e.g., the cab portion 204), as well as the second sensors 208B are experiencing a pitch movement.

Additionally, or alternatively, the computing device(s) 122 can determine that at least a portion of the vehicle 102 is experiencing a pitch movement based at least in part on one or more targets and/or a reference. In some implementations, the computing device(s) 122 can determine the movement associated with the second portion of the vehicle 102 based at least in part on a comparison of a position of a first target and a position of a second target with a reference. By way of example, the computing device(s) 122 can compare a position of a first target 410D (e.g., located in the top-left corner of the cab back) and/or a position of a second target 410C (e.g., located in the top-right corner of the cab back and not shown in FIGS. 7A-B) to a reference to determine whether the second portion of the vehicle 102 is experiencing a pitch movement. The reference can include, for example, the fixed location of a first sensor(s) 208A. The first sensor(s) 208A can be located onboard the first portion such as a frame portion (e.g., FIG. 7A) and/or a trailer portion (e.g., FIB. 7B). In the event that the distance between the first and/or second target 410C-D has increased or is increasing with respect to the fixed location of the second sensor 208A, the computing device(s) 122 can determine that the second portion of the vehicle 102 (e.g., the cab portion 204) is experiencing a forward pitch movement (e.g., moving away from the first sensor(s) 208A). In the event that the distance between the first and/or second target 410C-D has decreased or is decreasing with respect to the fixed location of the first sensor(s) 208A, the computing device(s) 122 can determine that the second portion (e.g., cab portion) is experiencing a backward pitch movement (e.g., moving towards the first sensor(s) 208A). Additionally, or alternatively, the computing device(s) 122 can determine the existence of a pitch movement (e.g., of the second portion of the vehicle 102) based at least in part on a comparison of the distance between a reference and the targets 410A-B to the distance between a reference and the targets 410A-B, in a manner similar to that described herein for determining a yaw movement.

The example vehicle movements 400, 500, 600, and 700A-B depict movement of a second portion of the vehicle 102 (e.g., cab portion 204). This is not meant to be limiting. The computing device(s) 122 can also, or alternatively, determine the movement associated with the first portion of the vehicle 102 in a similar manner. For example, as described herein, the target(s) can be located on the first portion of the vehicle 102 (e.g., the frame portion 202, the trailer portion 302). The computing device(s) 122 can determine movement of the first portion of the vehicle 102 and the first sensor(s) 208A located onboard the first portion of the vehicle 102 (e.g., via data acquired by the second sensor(s) 208B).

In some implementations, the computing device(s) 122 can compare targets across portions to determine vehicle movement (e.g., movement of one portion relative to another). For example, the computing device(s) 122 can obtain data associated with the target(s) on the vehicle 102 via the first sensor(s) 208A and the second sensor(s) 208B. The computing device(s) 122 can compare the characteristics (e.g., position, orientation, etc.) of a first target located onboard the second portion of the vehicle 102 (e.g., the cab portion 204) to the characteristics of a second target located on the first portion of the vehicle 102 (e.g., the frame portion 202, the trailer portion 302) to determine the movement associated with the second portion (e.g., cab portion 204) and/or the movement of the first portion (e.g., frame portion 202, trailer portion 302) relative to one another. The first and second portions can be experiencing similar and/or different types of movements. For example, the second portion (e.g., cab portion 204) can experience a yaw movement and the first portion (e.g., frame portion 202, trailer portion 302) can also be experiencing a yaw movement and/or a pitch movement. As such, the data 124 associated with the target(s) on the second portion (e.g., cab portion 204) may be skewed by the movement of the second portion. Thus, in this way, the computing device(s) 122 can determine the relative movements of the first and second portions to compensation for any such effect by tailoring a sensor correction accordingly.

Returning to FIG. 1, the computing device(s) 122 (of the vehicle computing system 101) can determining a sensor correction action 126 associated with at least one of the first sensor(s) 208A or the second sensor(s) 208B based at least in part on the movement. For instance, the computing device(s) 122 can determine a sensor correction action 126 of one or more second sensors 208B located onboard the second portion of the vehicle 102 based at least in part on the movement associated with the second portion of the vehicle 102. Additionally, or alternatively, the computing device(s) 122 can determine a sensor correction action 126 of one or more first sensors 208A located onboard the first portion of the vehicle 102 based at least in part on the movement associated with the first portion of the vehicle 102. The computing device(s) 122 can implement the sensor correction action 126 for at least one of the first sensors 208A or the second sensors 208B.

By way of example, the computing device(s) 122 can determine that a field of view of the second sensor(s) 208B (e.g., the cab mounted LIDAR system) has shifted due to the movement of the second portion (e.g., a backwards pitch movement of the cab portion 204). The computing device(s) 122 can determine that the second sensor(s) 208B should be physically adjusted to compensate for the pitch in order to correct the sensors' field of view. As such, the vehicle computing system can send one or more control signals 128 to physically adjust the second sensor(s) 208B to implement the sensor correction action 126.

Additionally, or alternatively, the sensor correction action 126 can include an action that does not incorporate physical manipulation of a sensor. For example, a region of interest associated with the second sensor(s) 208B (e.g., within the field of view) may have changed due to the movement of the second portion of the vehicle 102. By way of example, after movement of the cab portion 204, a region of interest may include more area above the vehicle 102 than intended or needed for autonomous navigation. The computing device(s) 122 can determine that the region of interest should be adjusted to compensate for the cab movement. Accordingly, the computing device(s) 122 can send one or more control signals 128 to adjust the region of interest associated with the second sensor(s) 208B such that the second sensor(s) 208B focuses on the correct region of interest within the field of view.

In another example, the computing device(s) 122 can determine that the second sensor(s) 208B may acquire sensor data at an abnormal angle due to the movement of the second portion (e.g., a roll movement of the cab portion 204). The computing device(s) 122 can determine that a transformation parameter (e.g., data transformation function, algorithm, variable) should be applied to the sensor data (e.g., image data) captured by the second sensor(s) 208B to correct for abnormalities caused by the movement of the cab portion (e.g., the abnormal angle). Accordingly, the computing device(s) 122 can send one or more control signals 128 to adjust the sensor data in accordance with the transformation parameter to properly compensate for the vehicle movement that affects the sensor data.

In some implementations, the computing device(s) 122 can adjust other components of the vehicle 102 based at least in part on the movement associated with the vehicle 102 (e.g., associated with the first and/or second portions of the vehicle). For instance, the computing device(s) 122 can determine that the second portion of the vehicle 102 is experiencing a movement, as described. The computing device(s) 122 determine an adjustment action 130 associated with another component of the vehicle 102 based at least in part on the movement associated with the second portion of the vehicle 102. By way of example, the computing device(s) 122 can determine that a potentiometer associated with the vehicle's shocks should be adjusted to compensate for such movement. The computing device(s) 12 can adjust the potentiometer based at least in part on the adjustment action. For instance, the computing device(s) 122 can send one or more control signals to cause the potentiometer to adjust in accordance with the adjustment action 130 to compensate for the detected movement.

In some implementations, the computing device(s) 122 can provide data 132 to one or more computing devices that are remote from the vehicle 102. The remote computing device(s) can be associated with the operations computing system 104. The data 132 can include at least one of the data associated with the one or more targets, data associated with the movement of a portion of the vehicle (e.g., the cab portion 204, the frame portion 202, the trailer portion 302), data associated with the sensor correction action, data associated with an adjustment action, and/or other data. The operations computing system 104 can process the data 132 to determine parameters (e.g., grade, quality, incline) associated with a particular travel way (e.g., road) on which the vehicle 102 is/was travelling. Such information can be utilized for future vehicle routing (e.g., to avoid certain travel ways), to update map data (e.g., to indicate hazardous conditions), etc. In some implementations, the operations computing system 104 can use the information to pre-configure the vehicle's sensors for one or more travel way segment(s). By way of example, the operations computing system 104 can provide data 134 indicative of a sensor correction action and/or an adjustment action to the vehicle 102 or another vehicle (e.g., before the respective vehicle travels across a travel way) so that the vehicle can be pre-configured to implement a sensor correction action and/or an adjustment action before/as the vehicle travels across the travel way.

Figure 8:
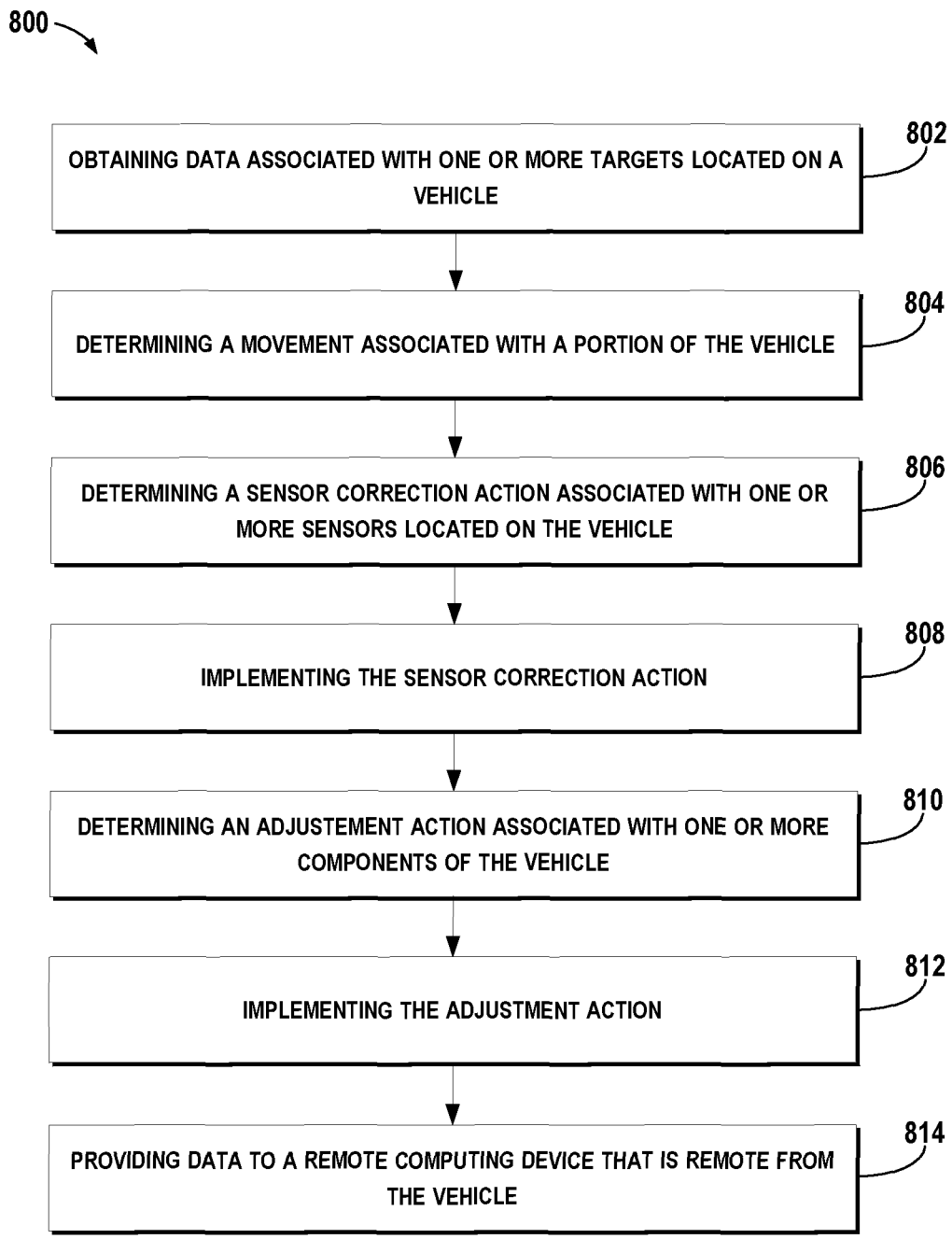
FIG. 8 depicts a flow diagram of an example method of automatically calibrating autonomous vehicle sensors according to example embodiments of the present disclosure.

FIG. 8 depicts a flow diagram of an example method 800 of automatically calibrating autonomous vehicle sensors according to example embodiments of the present disclosure. One or more portion(s) of the method 800 can be implemented by one or more computing devices such as, for example, the computing device(s) 122 of FIG. 1. Moreover, one or more portion(s) of the method 800 can be implemented as an algorithm on the hardware components of the device(s) described herein (e.g., as in FIGS. 1 and 10) to, for example, automatically calibrate autonomous vehicle sensors. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (802), the method 800 can include obtaining data associated with one or more targets located on a vehicle. For instance, the computing device(s) 122 can obtain data 124 associated with one or more targets 210 located onboard a vehicle 102. The data 124 associated with the one or more targets 210 can be acquired via one or more first sensors 208A located onboard a first portion of the vehicle 102. The one or more targets 210 can be located onboard a second portion of the vehicle 102. Additionally, or alternatively, data 124 associated with the one or more targets 210 can be acquired via one or more second sensors 208B located onboard a second portion of the vehicle 102. The one or more targets 210 can be located onboard the first portion of the vehicle 102. The one or more second sensors 208B (and/or first sensors 208A) can be configured to capture sensor data associated with a surrounding environment of the vehicle 102. An autonomous navigation of the vehicle 102 can be based at least in part on the sensor data. For example, at least one of the one or more first sensors 208A located onboard the first portion or the one or more second sensors 208B located onboard the second portion of the vehicle 102 can include at least one of a LIDAR system (e.g., that captures sensor data for use in the autonomy system 108 of the vehicle 102) or a camera.

As described herein, the vehicle 102 can be an autonomous truck (e.g., as shown in FIG. 2). The first portion can be a frame portion 202 of the autonomous truck, a trailer portion 302 of the autonomous truck, and/or another portion. The second portion can be a cab portion 204 of the autonomous truck and/or another portion.

At (804), the method 800 can include determining a movement associated with a portion of the vehicle. For instance, the computing device(s) 122 can determine a movement associated with the second portion of the vehicle 102 (and/or the first portion) based at least in part on the data 124 associated with the one or more targets. By way of example, the data 124 associated with the one or more targets can be indicative of at least one of a position or an orientation (or another characteristic) associated with at least one of the one or more targets. As described herein, the computing device(s) 122 can determine a movement of a portion of the vehicle 102 by determining a change in at least one of the position or the orientation (or other characteristic) associated with the at least one target. The movement associated with the second portion (and/or first portion) of the vehicle 102 can include at least one of a roll movement, a pitch movement, a yaw movement, a change in elevation, or other types of movement. In some implementations, the computing device(s) 122 can employ other device(s) (e.g., accelerometer, gyroscope) onboard the vehicle 102 to detect and/or confirm a movement of a portion of the vehicle 102.

At (806), the method 800 can include determining a sensor correction action associated with one or more sensors located on the vehicle. For instance, the computing device(s) 122 can determine a sensor correction action 126 associated with one or more second sensors 208B located onboard the second portion of the vehicle 102 based at least in part on the movement associated with the second portion of the vehicle 102 (and/or the relative movement of the second portion to the first portion). Additionally, or alternatively, the computing device(s) 122 can determine a sensor correction action 126 associated with one or more first sensors 208A located onboard the first portion of the vehicle 102 based at least in part on the movement associated with the first portion of the vehicle 102 (and/or the relative movement of the first portion to the second portion).

At (808), the method 800 can include implementing the sensor correction action. For instance, the computing device(s) 122 can implement the sensor correction action 126 for the one or more second sensors 208B located onboard the second portion of the vehicle 102 (and/or the first sensors 208A located onboard the first portion of the vehicle 102). The computing device(s) 122 can provide one or more control signals 128 to implement the sensor correction action 126 for the one or more second sensors 208B (and/or the one or more first sensors 208A). By way of example, the sensor correction action 126 can include a physical adjustment of the one or more second sensors 208B (and/or the first sensors 208A). The computing device(s) 122 can provide the one or more control signals 128 to physically adjust the one or more second sensors 208B (and/or the first sensors 208A). Additionally, or alternatively, the sensor correction action 126 can include an application of a transformation parameter to the sensor data acquired via the one or more second sensors 208B (and/or the first sensors 208A). The computing device(s) 122 can cause the transformation parameter to be applied to the sensor data (e.g., via communication with the autonomy system 108, application by a computing device associated with the sensors 106, application by the computing device(s) 122).

In some implementations, at (810), the method 800 can include determining an adjustment action associated with one or more components of the vehicle. For instance, the computing device(s) 122 can determine an adjustment action 130 associated with another component (e.g., potentiometer) of the vehicle 102 based at least in part on the movement associated with the at least one of the first portion or the second portion of the vehicle 102. As described herein, the computing device(s) 122 can adjust the other component of the vehicle 102 based at least in part on the adjustment action 130, at (812).

At (814), the method 800 can include providing data to a remote computing device that is remote from the vehicle. For instance, the computing device(s) 122 can provide data 132 to a remote computing device that is remote from the vehicle (e.g., of the operations computing system 104). The data 132 can include at least one of the data associated with the one or more targets, data associated with the movement of the second portion of the autonomous vehicle, or data associated with the sensor correction action. The computing device(s) 122 can also, or alternatively, send other data described herein to the remote computing device. As described herein, this can help pre-configure the sensors of the vehicle 102 and/or other vehicles for certain expected movements.

Figure 9:
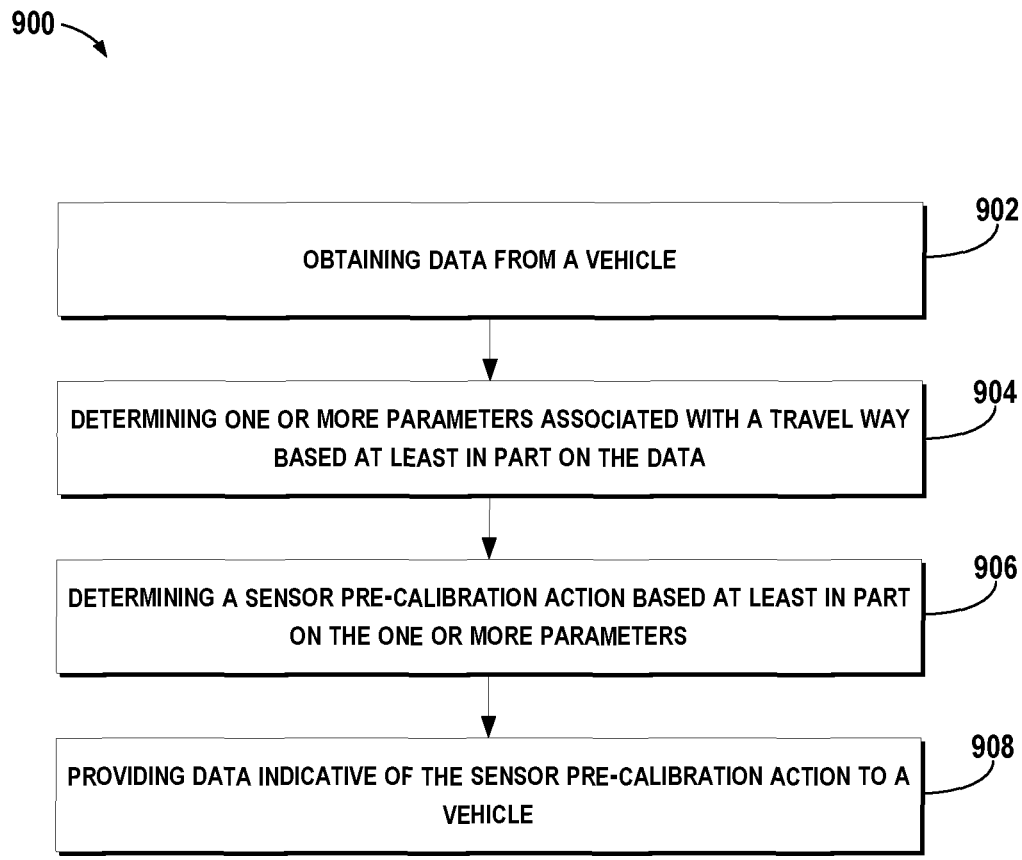
FIG. 9 depicts a flow diagram of an example method of automatically pre-calibrating autonomous vehicle sensors according to example embodiments of the present disclosure.

FIG. 9 depicts a flow diagram of an example method 900 of automatically pre-calibrating autonomous vehicle sensors according to example embodiments of the present disclosure. One or more portion(s) of the method 900 can be implemented by one or more computing devices such as, for example, one or more computing device(s) of the operations computing system 104. Moreover, one or more portion(s) of the method 900 can be implemented as an algorithm on the hardware components of the device(s) described herein (e.g., as in FIGS. 1 and 10) to, for example, automatically pre-calibrate autonomous vehicle sensors. FIG. 9 depicts elements performed in a particular order only for purposes of illustration and discussion and is not meant to be limiting.

At (902), the method 900 can include obtaining data from a vehicle. For instance, the computing device(s) of the operations computing system 104 (which are remote from the vehicle 102) can obtain the data 132 provided by the vehicle 102. As described herein, the data 132 can include at least one of the data associated with the one or more targets, data associated with the movement of a portion of the vehicle (e.g., the cab portion 204, the frame portion 202, the trailer portion 302), data associated with the sensor correction action, data associated with an adjustment action, and/or other data.

At (904), the method 900 can include determining one or more parameters associated with a travel way based at least in part on the data. For instance, the computing device(s) of the operations computing system 104 can determine one or more parameters associated with a travel way associated with the vehicle 102 (e.g., on which the vehicle is or was travelling) based on the data 132. By way of example, the computing device(s) of the operations computing system 104 can determine the grade, quality, incline, expected vehicle movement, etc. associated with a particular travel way based on the data indicative of the movement experience by the vehicle 102 (a portion thereof).

At (906), the method 900 can include determining a sensor pre-calibration action based at least in part on the one or more parameters. For instance, the computing device(s) of the operations computing system can determine a sensor pre-calibration action based at least in part on the one or more parameters associated with the travel way. The sensor pre-calibration action can include an action to compensate for the movement a vehicle may experience while traveling along the travel way. For example, the sensor pre-calibration action can include a physical adjustment of the sensor, an adjust of a region of interest, application of a transformation parameter, and/or other actions that help compensate for the potential movement of a portion of a vehicle. In some implementations, in a similar manner, the computing device(s) of the operations computing system can determine an adjustment action for another component of the vehicle in order to ready the component for the travel way.

At (908), the method 900 can include providing data indicative of the sensor pre-calibration action to a vehicle. For instance, the computing device(s) of the operations computing system can provide data 134 indicative of a sensor pre-calibration action (and/or an adjustment action)

to the vehicle 102 and/or another vehicle. The data 134 can be provided before and/or while the vehicle travels along the particular associated travel way. In this way, the vehicle can be pre-configured to implement a sensor pre-calibration action and/or an adjustment action for the particular travel way. For example, the vehicle can implement the sensor pre-calibration action so that the onboard sensors are proactively adjusted to compensate for movement of the portion of the vehicle on which the sensors are located.

Figure 10:
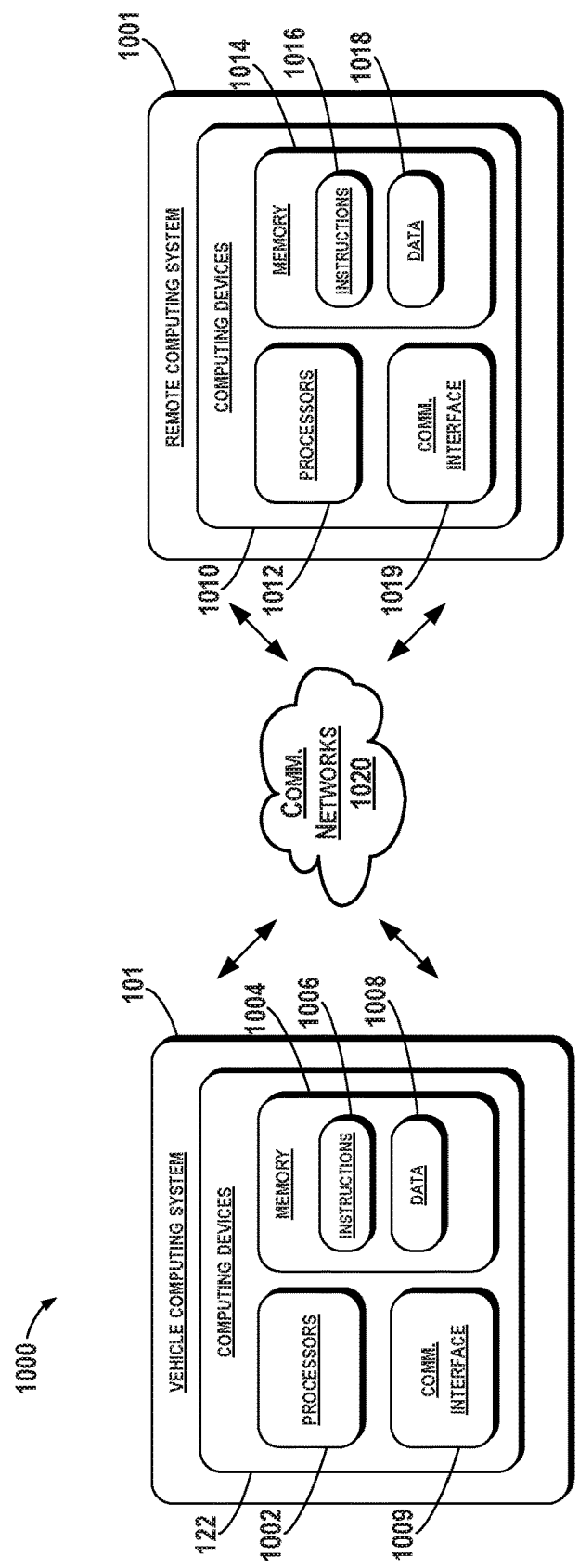
FIG. 10 depicts example system components according to example embodiments of the present disclosure.

FIG. 10 depicts an example computing system 1000 according to example embodiments of the present disclosure. The example system 1000 illustrated in FIG. 10 is provided as an example only. The components, systems, connections, and/or other aspects illustrated in FIG. 10 are optional and are provided as examples of what is possible, but not required, to implement the present disclosure. The example system 1000 can include the vehicle computing system 101 of the vehicle 102 and, in some implementations, a remote computing system 1001 including one or more remote computing device(s) that are remote from the vehicle 102 that can be communicatively coupled to one another over one or more networks 1020. The remote computing system 1001 can be associated with a central operations system and/or an entity associated with the vehicle 102 such as, for example, a vehicle owner, vehicle manager, fleet operator, service provider, etc. The remote computing system 1001 can correspond to the operations computing system 104.

The computing device(s) 122 of the vehicle computing system 101 can include processor(s) 1002 and a memory 1004. The one or more processors 1002 can be any suitable processing device (e.g., a processor core, a microprocessor, an ASIC, a FPGA, a controller, a microcontroller, etc.) and can be one processor or a plurality of processors that are operatively connected. The memory 1004 can include one or more non-transitory computer-readable storage media, such as RAM, ROM, EEPROM, EPROM, one or more memory devices, flash memory devices, etc., and combinations thereof.

The memory 1004 can store information that can be accessed by the one or more processors 1002. For instance, the memory 1004 (e.g., one or more non-transitory computer-readable storage mediums, memory devices) on-board the vehicle can include computer-readable instructions 1006 that can be executed by the one or more processors 1002. The instructions 1006 can be software written in any suitable programming language or can be implemented in hardware. Additionally, or alternatively, the instructions 1006 can be executed in logically and/or virtually separate threads on processor(s) 1002.

For example, the memory 1004 on-board the vehicle can store instructions 1006 that when executed by the one or more processors 1002 on-board the vehicle 102 cause the one or more processors 1002 (the computing system 101) to perform operations such as any of the operations and functions of the computing device(s) 122 or for which the computing device(s) 122 are configured, as described herein, the operations for automatically calibrating autonomous vehicle sensors (e.g., one or more portions of method 800), and/or any other functions for automatically calibrating autonomous vehicle sensors, as described herein.

The memory 1004 can store data 1008 that can be obtained, received, accessed, written, manipulated, created, and/or stored. The data 1008 can include, for instance, sensor data, data associated with one or more targets, data indicative of vehicle movement, data associated with sensor correction actions, data associated with adjustment actions, and/or any other data/information, as described herein. In some implementations, the computing device(s) 122 can obtain data from one or more memory device(s) that are remote from the vehicle.

The computing device(s) 122 can also include a communication interface 1009 used to communicate with one or more other system(s) on-board the vehicle and/or a remote computing device that is remote from the vehicle (e.g., of remote computing system 1001). The communication interface 1009 can include any circuits, components, software, etc. for communicating with one or more networks (e.g., 1020). In some implementations, the communication interface 1009 can include, for example, one or more of a communications controller, receiver, transceiver, transmitter, port, conductors, software and/or hardware for communicating data.

In some implementations, the vehicle computing system 101 can further include a positioning system. The positioning system can determine a current position of the vehicle. The positioning system can be any device or circuitry for analyzing the position of the vehicle. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle can be used by various systems of the vehicle computing system 101.

The computing device(s) 1010 of the computing system 1001 (e.g., the operations computing system 104) can include processor(s) 1012 and a memory 1014. The one or more processors 1012 can be any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage media, such as RAM, ROM, EEPROM, EPROM, one or more memory devices, flash memory devices, etc., and combinations thereof.

The memory 1014 can store information that can be accessed by the one or more processors 1012. For instance, the memory 1014 (e.g., one or more non-transitory computer-readable storage mediums, memory devices) can include computer-readable instructions 1016 that can be executed by the one or more processors 1012. The instructions 1016 can be software written in any suitable programming language or can be implemented in hardware. Additionally, or alternatively, the instructions 1016 can be executed in logically and/or virtually separate threads on processor(s) 1012.

For example, the memory 1014 can store instructions 1016 that when executed by the one or more processors 1012 cause the one or more processors 1012 (the computing system 1001) to perform operations such as any of the operations and functions of the operations computing system 104, the operations and functions for automatically pre-calibrating autonomous vehicle sensors (e.g., one or more portions of method 900), and/or other functions.

The memory 1014 can store data 1018 that can be obtained, received, accessed, written, manipulated, created, and/or stored. The data 1018 can include, for instance, data provided by a vehicle, data associated with the one or more targets, data associated with the movement of a portion of the vehicle, data associated with a sensor correction action, data associated with an adjustment action, data associated with a sensor pre-calibration action, and/or any other data/information, as described herein. In some implementations, the computing device(s) 1010 can obtain data from one or more memory device(s) that are remote from the computing system 1001.

The computing device(s) 1010 can also include a communication interface 1019 used to communicate with one or more other system(s) of the computing system 1001 and/or a remote computing device (e.g., vehicle computing system 101). The communication interface 1019 can include any circuits, components, software, etc. for communicating with one or more networks (e.g., 1020). In some implementations, the communication interface 1019 can include for example, one or more of a communications controller, receiver, transceiver, transmitter, port, conductors, software and/or hardware for communicating data.

The network(s) 1020 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 620 can be accomplished, for instance, via a communication interface using any type of protocol, protection scheme, encoding, format, packaging, etc.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of automatically calibrating autonomous vehicle sensors, comprising:
    obtaining, by a computing system comprising one or more computing devices, data associated with one or more targets located onboard an autonomous vehicle, wherein the data associated with the one or more targets is acquired via one or more first sensors located onboard a first portion of the autonomous vehicle, wherein the one or more targets are located onboard a cab portion of the autonomous vehicle;
    determining, by the computing system, a movement associated with the cab portion of the autonomous vehicle based at least in part on the data associated with the one or more targets;
    determining, by the computing system, a sensor correction action for adjusting one or more second sensors located onboard the cab portion of the autonomous vehicle based at least in part on the movement associated with the cab portion of the autonomous vehicle, wherein the one or more second sensors comprise a LIDAR sensor located onboard the cab portion of the autonomous vehicle, and wherein the LIDAR sensor is configured to generate sensor data for vehicle motion planning; and
    providing, by the computing system, one or more command signals to a computing system associated with the one or more second sensors to adjust the LIDAR sensor located onboard the cab portion of the autonomous vehicle in accordance with the sensor correction action.

2. The computer-implemented method of claim 1, wherein the data associated with the one or more targets is indicative of at least one of a position or an orientation associated with at least one of the one or more targets, and wherein determining the movement associated with the cab portion of the autonomous vehicle comprises:
    determining, by the computing system, a change in at least one of the position or the orientation associated with the at least one of the one or more targets.

3. The computer-implemented method of claim 1, wherein the movement associated with the cab portion of the autonomous vehicle comprises at least one of a roll movement, a pitch movement, a yaw movement, or a change in elevation.

4. The computer-implemented method of claim 1, wherein the sensor correction action comprises a physical adjustment of the LIDAR sensor, and wherein providing the one or more control signals comprises:
    providing, by the computing system, the one or more command signals to physically adjust the LIDAR sensor.

5. The computer-implemented method of claim 1, further comprising:
    determining, by the computing system, an adjustment action associated with another component of the autonomous vehicle based at least in part on the movement associated with the cab portion of the autonomous vehicle; and
    adjusting, by the computing system, the another component of the autonomous vehicle based at least in part on the adjustment action.

6. A computing system for automatically calibrating autonomous vehicle sensors, comprising:
    one or more processors; and
    one or more tangible, non-transitory, computer readable media that collectively store instructions that when executed by the one or more processors cause the computing system to perform operations, the operations comprising:
        obtaining data associated with one or more targets located onboard an autonomous vehicle, wherein the data associated with the one or more targets is acquired via one or more first sensors located onboard a first portion of the autonomous vehicle;
        determining a movement associated with a cab portion of the autonomous vehicle based at least in part on the data associated with the one or more targets;
        determining a sensor correction action for adjusting one or more second sensors located onboard the cab portion of the autonomous vehicle based at least in part on the movement associated with the cab portion of the autonomous vehicle, wherein the one or more second sensors comprise a LIDAR sensor located onboard the cab portion of the autonomous vehicle, and wherein the LIDAR sensor is configured to generate sensor data for vehicle motion planning; and providing one or more command signals to a computing system associated with the one or more second sensors to adjust the LIDAR sensor located onboard the cab portion of the autonomous vehicle in accordance with the sensor correction action.

7. The computing system of claim 6, wherein the one or more targets is located onboard the cab portion of the autonomous vehicle.

8. The computing system of claim 6, wherein the first portion is a frame portion of the autonomous vehicle.

9. The computing system of claim 6, wherein the operations further comprise:

providing, to a remote computing device that is remote from the autonomous vehicle, at least one of the data associated with the one or more targets, data associated with the movement of the cab portion of the autonomous vehicle, or data associated with the sensor correction action.

10. The computing system of claim 6, wherein the one or more targets comprise a first target and a second target, and wherein determining the movement associated with the cab portion of the autonomous vehicle based at least in part on the data associated with the one or more targets comprises:

determining the movement associated with the second portion of the autonomous vehicle based at least in part on a comparison of a position of the first target to a position of the second target.

11. The computing system of claim 10, wherein the movement associated with the cab portion of the autonomous vehicle is associated with a roll movement of the cab portion of the autonomous vehicle.

12. The computing system of claim 6, wherein the one or more targets comprises a first target and a second target; and wherein determining the movement associated with the cab portion of the autonomous vehicle based at least in part on the data associated with the one or more targets comprises:

determining the movement associated with the cab portion of the autonomous vehicle based at least in part on a comparison of a position of the first target and a position of the second target with a reference.

13. The computing system of claim 12, wherein the movement associated with the cab portion of the autonomous vehicle is a change in pitch of the autonomous vehicle.

14. An autonomous vehicle, comprising:

a first portion with one or more first sensors;

a cab portion with one or more second sensors; wherein the one or more second sensors comprise a LIDAR sensor configured to generate sensor data for vehicle motion planning;

one or more processors; and one or more tangible, non-transitory, computer readable media that collectively store instructions that when executed by the one or more processors cause the one or more processors to perform operations, the operations comprising:

obtaining data associated with one or more targets located onboard the autonomous vehicle;

determining a movement associated with the cab portion of the autonomous vehicle based at least in part on the data associated with the one or more targets;

determining a sensor correction action for adjusting the LIDAR sensor based at least in part on the movement associated with the cab portion of the autonomous vehicle; and adjusting the LIDAR sensor of the cab portion of the autonomous vehicle in accordance with the sensor correction action.

15. The autonomous vehicle of claim 14, wherein the one or more second sensors are configured to capture sensor data associated with a surrounding environment of the autonomous vehicle, wherein an autonomous navigation of the autonomous vehicle is based at least in part on the sensor data.

16. The autonomous vehicle of claim 15, wherein the sensor correction action comprises an application of a transformation parameter to the sensor data acquired via the LIDAR sensor.

17. The autonomous vehicle of claim 14, wherein the one or more targets are located on the first portion.

18. The computer-implemented method of claim 1, wherein the sensor correction action is associated with an acquisition or processing of sensor data associated with the LIDAR sensor.

19. The computer-implemented method of claim 1, wherein the autonomous vehicle is an autonomous truck, wherein the first portion is a frame portion of the autonomous truck.

* * * * *